US008066155B2

(12) United States Patent
Tada

(10) Patent No.: US 8,066,155 B2
(45) Date of Patent: Nov. 29, 2011

(54) TRIGGER TYPE PUMP DISPENSER

(75) Inventor: Tetsuya Tada, Tokyo (JP)

(73) Assignee: Canyon Co., Ltd., Shinagawa-ku, Tokyo (JP)

( * ) Notice: Subject to any disclaimer, the term of this patent is extended or adjusted under 35 U.S.C. 154(b) by 359 days.

(21) Appl. No.: 12/309,753

(22) PCT Filed: Dec. 13, 2007

(86) PCT No.: PCT/JP2007/074003

§ 371 (c)(1), (2), (4) Date: Jan. 28, 2009

(87) PCT Pub. No.: WO2008/072686

PCT Pub. Date: Jun. 19, 2008

(65) Prior Publication Data

US 2010/0243680 A1 Sep. 30, 2010

(30) Foreign Application Priority Data

Dec. 15, 2006 (JP) ................................. 2006-339119

(51) Int. Cl.
*B67D 7/58* (2010.01)
*B05B 11/00* (2006.01)
*F16L 11/00* (2006.01)

(52) U.S. Cl. ...................... 222/383.1; 222/385; 138/118

(58) Field of Classification Search .... 222/321.1–321.9, 222/372–385
See application file for complete search history.

(56) References Cited

U.S. PATENT DOCUMENTS

| | | | | |
|---|---|---|---|---|
| 4,061,250 | A * | 12/1977 | Tada | 222/321.8 |
| 4,082,223 | A * | 4/1978 | Nozawa | 239/333 |
| 4,383,555 | A * | 5/1983 | Finley | 138/129 |
| 4,691,849 | A * | 9/1987 | Tada | 222/382 |
| 5,114,052 | A * | 5/1992 | Tiramani et al. | 222/207 |
| 5,890,632 | A | 4/1999 | Chalupsky et al. | |
| 6,123,236 | A * | 9/2000 | Bloom | 222/341 |
| 6,286,728 | B1 * | 9/2001 | Driskell et al. | 222/383.1 |
| 7,377,408 | B2 * | 5/2008 | Kasting et al. | 222/321.8 |
| 7,857,174 | B2 * | 12/2010 | Michaux et al. | 222/507 |

FOREIGN PATENT DOCUMENTS

| | | | |
|---|---|---|---|
| CA | 1 097 874 | | 3/1981 |
| GB | 2 310 149 | A | 8/1997 |
| JP | 03-229660 | | 10/1991 |
| JP | 11-076884 | | 3/1999 |
| JP | 2005-342571 | | 12/2005 |
| JP | 2006-159004 | | 6/2006 |

* cited by examiner

*Primary Examiner* — Kevin P Shaver
*Assistant Examiner* — Nicholas Weiss
(74) *Attorney, Agent, or Firm* — Flynn, Thiel, Boutell & Tanis, P.C.

(57) ABSTRACT

A trigger-type pump dispenser capable of preventing deformation of a channel of a coupling part when a piston is vertically pushed down by a trigger even in a structure in which the coupling part bends and a nozzle does not vertically move. The dispenser has a base main body 1 having the cylinder part 11 inside and attachable to an opening part of a container main body. A cover body 4 detachably latched with the base main body. A piston structure 2 composed of the nozzle part 21 engaged with the base main body, the piston part 23, and a bendable coupling part coupling the nozzle part and the piston part. Many fins 22A are formed on the periphery of the coupling part 22 so that an interior channel is not deformed.

8 Claims, 5 Drawing Sheets

TRIGGER TYPE PUMP DISPENSER

TECHNICAL FIELD

The present invention relates to a trigger-type pump dispenser which is free from vertical movement of a nozzle part and facilitates pointing at a target upon jetting.

More particularly, the present invention relates to a trigger-type pump dispenser which jets liquid in a cylinder from the nozzle part to outside by vertically sliding a piston member, wherein the trigger-type pump dispenser is capable of precisely hitting a position serving as a target by the liquid in the state in which there is completely no vertical movement of the nozzle part and has a simple structure.

Conventionally, a trigger-type pump dispenser has been used as a means which jets liquid such as a chemical solution to a predetermined part.

The pump dispenser has advantages that a piston is moved merely by operating a trigger so as to readily jet liquid, which is in a container connected to a cylinder, from a nozzle and is widely used.

In such a trigger-type pump dispenser having a trigger, generally, the direction is set toward the position that is a target of jetting by holding a dispenser main body, and an operation of pulling a trigger structure (in other words, turning operation) is carried out.

Then, when the trigger is pulled, a part thereof pushes down a head part of a piston part.

Consequently, the piston part is lowered, the liquid in the cylinder is compressed; and, as a result, the liquid is jetted to outside from the nozzle through a channel in the piston.

In this case, since the piston part and the nozzle are coupled with each other, as a matter of course, the nozzle is integrally lowered at the same time as lowering of the piston.

Therefore, such moving motion of the nozzle occurs during jetting, and a jet track becomes a continuous linear track.

In this manner, the structure in which the nozzle part is vertically moved has drawbacks that the nozzle cannot set a target on the location serving as a jetting target and that the jetted liquid cannot reach a right location.

In order to solve such problems, a trigger-type pump dispenser having a structure in which a nozzle part does not vertically move has been developed (Patent Document 1).

However, this trigger-type pump dispenser does not directly transmit the movement of the trigger to the piston.

More specifically, since the trigger transmits the movement thereof to the piston via a swing lever, the structure around the trigger becomes complex, and transmission efficiency of power is bad from the viewpoint of friction force.

In addition, since the number of parts is large, assembling man-hours are increased, and failure readily occurs.

In order to solve such problems, the present inventor has developed an innovative trigger-type pump dispenser having a structure in which the vertical movement of a piston is not directly transmitted to a nozzle part.

In this trigger-type pump dispenser, a piston structure comprises a nozzle part, a piston part, and a coupling part coupling both of them, wherein the coupling part is bendable.

As a result, since the nozzle part is not vertically moved at all, liquid can be caused to reach a target position precisely.

However, when the coupling part is bent upon jetting, a channel in the coupling part (specifically, the cross sectional shape thereof) is deformed and narrowed.

Therefore, the liquid does not efficiently pass through the channel in some cases.

Meanwhile, a piston structure in which a nozzle part, a coupling part, and a piston part are integrated is generally manufactured by injection molding.

In that case, the part between the nozzle part and the piston part, i.e., the coupling part is molded in an L-shape bent state; therefore, molds for the molding become inevitably large.

When a plurality of piston structures as many as possible are to be molded by molds having a certain size, bending the coupling part into the L-shape has to be avoided.

Patent Document 1: Japanese Patent Application Laid-Open (kokai) No. H10-43648

DISCLOSURE OF INVENTION

Problems to be Solved by the Invention

The present invention has been accomplished based on such background techniques and accomplished to overcome the above described technical problems.

Thus, it is an object of the present invention to provide a pump dispenser capable of preventing deformation of a channel of a coupling part when a piston is pushed down by a trigger even when the trigger-type pump dispenser has a structure in which a coupling part is bent and a nozzle is not vertically moved.

Furthermore, it is also an object to provide a plurality of piston structures which can be produced as many as possible by molds having a certain size.

Means for Solving the Problems

Thus, the present inventor carried out diligent studies about such problem background and, as a result, found out that deformation of the cross section of the coupling part can be prevented by forming fins on the coupling part of the piston structure and that, when the coupling part can be bent by 90 degrees or more, piston structures as many as possible can be produced by molds; and the present invention has been accomplished based on this finding.

The present invention resides in (1) a trigger-type pump dispenser for jetting liquid, which is in a cylinder part, from a nozzle part to outside by vertically sliding a piston part in a cylinder by turning a trigger, the trigger-type pump dispenser having: a base main body having the cylinder part inside and attachable to an opening part of a container main body; a cover body detachably latched with the base main body; a piston structure composed of the nozzle part engaged with the base main body, the piston part, and a bendable coupling part coupling the nozzle part and the piston part; and the trigger turnably attached to the base main body for vertically sliding the piston part in the cylinder; wherein many fins are formed on the periphery of the coupling part so that an interior channel cross section is not deformed.

The present invention also resides in (2) the trigger-type pump dispenser according to above described (1), wherein the coupling part of the piston structure can be bent by an angle of 90 degrees or more.

The present invention also resides in (3) the trigger-type pump dispenser according to above described (1), wherein a rod-like closing valve for blocking the pressure in the container by sealing an channel, which is in the piston part, at a top dead point of the piston part is provided in the cylinder part.

The present invention also resides in (4) the trigger-type pump dispenser according to above described (3), wherein the rod-like closing valve is integrally formed with a first valve upon manufacturing and, upon use, separated from each other and subjected to use.

The present invention also resides in (5) the trigger-type pump dispenser according to above described (1), wherein an eave part for covering the latched part of the base main body and the cover body is provided on the cover body.

The present invention also resides in (6) the trigger-type pump dispenser according to above described (1), wherein a cap part and an introducing tube are integrated with the base main body.

The present invention also resides in (7) the trigger-type pump dispenser according to above described (1), wherein an end of the trigger is pivotally attached to the base main body by a first pivotally attached part, an intermediate position of the trigger is pivotally attached to the piston part by a second pivotally attached part.

The present invention also resides in (8) the trigger-type pump dispenser according to above described (7), wherein the ratio of the distance between the first pivotally attached part and the second pivotally attached part and the distance from the position of the first pivotally attached part to a distal end of the trigger is 1:4.5 or more.

Note that a configuration in which above (1) to (8) are arbitrarily combined can be also employed as long as the objects of the present invention are satisfied.

Effects of the Invention

In the trigger-type pump dispenser of the present invention, the coupling part of the piston structure can be bent, and the many fins are formed on the periphery thereof so that the interior channel is not deformed; therefore, the jetted liquid can efficiently and smoothly pass through the channel.

Moreover, the coupling part has the bendable structure that absorbs the vertical movement of the piston; therefore, extra parts are not required, the structure is simple, and less failure is caused.

Moreover, the coupling part of the piston structure can be bent by an angle of 90 degrees or more; therefore, the piston structure can be inject-molded in a linear state and then can be bent and assembled.

As a result, the piston structures as many as possible can be formed from the molds having a certain size.

Moreover, the rod-like closing valve which blocks the pressure in the container by sealing the channel in the piston part at the top dead point of the piston part is provided in the cylinder part; therefore, leakage from the nozzle part does not occur even when the pressure in the container main body is increased for some reasons and the liquid back-flows in the cylinder part.

Moreover, the rod-like closing valve is integrally formed with the first valve upon manufacturing and, upon use, separated and subjected to use; therefore, the number of parts is reduced.

Moreover, the eave part for covering the latched part of the base main body and the cover part is provided on the cover part; therefore, appearance is not deteriorated since the latched part is not seen from outside.

Moreover, the base main body is integrated with the cap part and the introducing tube; therefore, the number of parts is reduced as well.

Moreover, the end of the trigger is pivotally attached to the base main body by the first pivotally attached part, the intermediate position of the trigger is pivotally attached to the piston member by the second pivotally attached part, and the ratio of the distance between the first pivotally attached part and the second pivotally attached part and the distance from the position of the first pivotally attached part to the trigger distal end of the trigger is 1:4.5 or more; therefore, the trigger can be readily pulled (In other words, the trigger can be lightly actuated).

BEST MODE FOR CARRYING OUT THE INVENTION

Hereinafter, a best mode for carrying out the present invention will be explained based on drawings.

FIGS. 1A and 1B and FIG. 2 are drawings showing a trigger-type pump dispenser according to an embodiment of the present invention and are showing the states before pulling and after pulling a trigger 3, respectively.

The trigger-type pump dispenser slides a piston part 23 downward and jets liquid in a cylinder from a nozzle part 21 when the trigger 3 is pulled, in other words, turned as shown in FIG. 2.

In the trigger-type pump dispenser of the present invention, at this point, the position of the nozzle part 21 is not changed at all and is not vertically moved.

The trigger-type pump dispenser has, a base main body 1 which, first, directly attached to a container, a cover body 4 which is attached to the base main body 1, the trigger 3 which is attached to the base main body 1, and a piston structure 2 which is vertically moved by the trigger 3; and an interior channel formed by them has a first valve FV and a second valve SV.

Materials of these parts are synthetic resins, and they are mainly manufactured by injection molding.

For example, as the materials, a cap 13 and the base main body 1 uses a polypropylene resin (PP), the trigger 3 uses a polyoxymethylene resin (POM), the piston structure 2 uses a linear low-density polyethylene resin (LLDPE), a silicone resin, etc.

(Base Main Body)

The base main body 1 can be attached to an opening part of a container main body X.

More specifically, the base main body 1 integrally has the cap 13, and the cap 13 is detachable from the opening part of the container X by engagement or screwing.

Note that, as shown in FIG. 3, a cap 13A and the base main body 1 may be provided as separated parts.

In this case, base main body 1 is fixed to the opening part of the container X by screwing the cap 13A therewith and holding a lower end part of the base main body 1.

The base main body 1 has a hollow-cylindrical cylinder part 11, which is capable of housing the piston part 23 in the inside thereof, and an expanded part 12, which is enlarged above the cylinder part 11.

Below the cylinder part 11 which is a part of the base main body 1, a two-step tubular part 11A having a diameter smaller than that is formed, and the first valve FV (spring-equipped valve) is provided in a lower part (small-diameter part 11A1) of the tubular part 11A.

Note that the liquid in the container is sucked up into the cylinder part 11 through the first valve FV.

An introducing tube 11B which sucks up the liquid at the bottom of the container and introduces it to the first valve FV is integrally formed below the tubular part 11A.

A rod-like closing valve 5 is disposed in an upper part (large-diameter part 11A2) of the tubular part 11A, and a tip of the closing valve 5 is inserted into the interior of a small-diameter part 23A of the piston part 23.

When the piston part 23 is at a top dead point (position before pulling the trigger 3), a bulged part 51 at the tip of the closing valve 5 is in pressure-contact with the inner wall of the small-diameter part 23A of the piston part 23, and the channel of the liquid is closed.

Therefore, even when the liquid is elevated and back-flowed through the first valve FV when the inner pressure of the container X is increased in this state, there is an effect that the liquid does not escape toward the nozzle part 21.

Herein, the closing valve 5 is integrally formed with the first valve FV, for example, by injection molding as shown in FIG. 4, and, upon use, they are separated from each other and subjected to use.

A base part 52 of the closing valve 5 is divided into radial divided pieces, and the divided pieces are press-fitted on the inner wall of an upper part of the tubular part 11A (large-diameter part 11A2).

The first valve FV also abuts a valve seat of a lower part of the tubular part 11A (small-diameter part 11A1).

(Cover Body)

Meanwhile, the lid-like cover body 4 is removably latched above the expanded part 12 of the base main body 1.

An eave part 41 for covering the latched part is formed on the cover body 4 at the part latched with the base main body 1.

Since there is the eave part 41, the latched part is covered and cannot be readily seen from outside, and the appearance is good.

When the cover body 4 is removed from the base main body, the trigger 3, the piston structure 2, the cylinder part 11, etc. are exposed; therefore, there is an advantage that the interior can be readily cleaned.

When the pump dispenser is held, the base of the thumb abuts a rear part of the expanded part 12, and the part functions to support the weight thereof.

(Piston Structure)

In an upper part of the cylinder part 11 of the above described base main body 1, the two-step hollow cylindrical piston part 23 having the small-diameter part 23A is slidably provided, and the piston part 23 serves as a part of the piston structure 2 as described below.

FIG. 5 is a drawing showing the piston structure 2.

The piston structure 2 is formed of an elastically deformable resin such as linear low-density polyethylene (LLDPE) or a silicone resin and integrally has the nozzle part 21 at the front, the piston part 23 at the rear, and a coupling part 22 coupling the nozzle part 21 and the piston part 23 to each other.

Many fins 22A are formed on the surface of the coupling part 22; and, even when the material of the piston structure 2 including the coupling part 22 is a soft, for example, silicone resin, the interior channel of the coupling part 22 is not squashed by deforming.

Therefore, the coupling part 22 can be sufficiently bent by 90 degrees or more (See chain lines of FIG. 6).

At the point when the piston structure 2 is formed by molds (generally, injection molding), the piston part 23, the coupling part 22, and the nozzle part 21 thereof are linear in whole.

FIG. 6 is a drawing explaining an assembling operation example of the piston structure 2.

At this moment, the piston part 23 is attached to the cylinder part 11, and the piston structure 2 is in the state that it is linearly projected.

From this state, the coupling part 22 is bent in an L-shape, and the cover body 4 is pushed down so as to latch the nozzle part.

At this point, the nozzle part 21 is fixed so as to be sandwiched by the base main body 1 and the cover body 4 in the front; and, as a result, movement of the nozzle part caused along with movement of the piston part 23 is restricted.

In this manner, the linearly-formed piston structure 2 is bent nearly by 90 degrees at the part of the coupling part 22 and assembled.

More specifically, when distal ends of the base main body 1 and the cover body 4 are engaged with a circumferential groove 21A in the periphery of the nozzle part 21, the nozzle part 21 is fixed so as to be sandwiched by both of them.

Even when the piston part 23 is vertically moved in the state in which the nozzle part 21 is fixed, as is described later in detail, the coupling part 22 functions to actively absorb the vertical movement of the piston part 23 by bending deformation of the coupling part 22 since the coupling part 22 can be bent and deformed in an elastically compressed manner.

Note that the second valve SV (spring-equipped valve) is provided in the nozzle part 21, and the liquid in the container is finally discharged to outside through the second valve SV.

(Trigger)

Meanwhile, the trigger 3 which moves up/down the piston structure 2 has a two-diverged part 32, which is extended from a finger-rest part 31, and a spring part 33; wherein the two-diverged part 32 is attached to the base main body 1 and the piston part 23, and the spring part 33 is retained by and fixed to the base main body 1.

Specifically, in the trigger 3, an end and an intermediate position of the two-diverged part 32 are pivotally attached to the base main body 1 and the piston part 23, respectively.

In detail, at distal ends of the two-diverged part 32 of the trigger 3, circular holes 32B are formed, and the circular holes 32B are fitted with circular projections 12A1 formed on upright wall parts 12A of the base main body 1, thereby forming a first pivotally attached part P1.

A pair of circular projections 23A1 is formed on an outside wall of the small-diameter part 23A of the piston part 23, and the two-diverged part 32 of the trigger 3 is disposed so as to sandwich the small-diameter part 23A.

The circular projections 23A1 are fitted in circular holes 32A formed at intermediate positions of the two-diverged part 32, thereby forming a second pivotally attached part P2.

Herein, the ratio (i.e., "lever ratio") of a distance L1 between the first pivotally attached part P1 and the second pivotally attached part P2 and a distance L2 from the position of the first pivotally attached part P1 to the distal end of the trigger 31 is preferably 1:4.5 or more.

Note that, as described above, in the conventional trigger-type pump dispenser in which a nozzle N is fixed (Patent Document 1), since the structure thereof transmits movement of the trigger to the piston via the swing lever, achieving such "lever ratio" has been difficult because of the structure thereof.

The lever ratio of 1:4.5 or more can be achieved since the part between the second pivotally attached part and the first pivotally attached part P1 can be caused to be linear and shortened by placing the second pivotally attached part P2 on the side surfaces of the piston part like the present invention.

Note that the reason why the "lever ratio" herein uses the position of the distal end of the trigger 31 as a reference is that there is a tendency that holding positions of the forefinger and the middle finger are naturally determined when the length of the trigger 3 is set.

When the finger-rest part 31 of the trigger 3 is held and turned, wherein the first pivotally attached part P1 serves as a starting point, the distance between both of them is shortened, and the spring part 33 of the trigger 3 exerts bouncing force in the opposite direction.

More specifically, a distal end of the spring part 33 of the trigger 3 is fitted in a fixing part of the base main body 1 so as to be retained and fixed; and, when the finger-rest part 31 is held and pulled, the angle formed by the finger-rest part 31 and the spring part 33 is reduced, and the bouncing force works. When the holding fingers are released, the trigger 3 returns to the original position.

Meanwhile, an upper first sealing valve 23B1 for sealing the interior of the cylinder part 11 and a second sealing valve 23B2 which is below the first sealing valve 23B1 are formed in the piston part 23.

As is described below, outside air P and the interior of the container main body can be mutually switched between a communicated state and a non-communicated state via a ventilation hole S2 by the functions of the first sealing valve 23B1 and the second sealing valve 23B2 of the piston part 23.

On the wall of the cylinder part 11, the ventilation hole S2 is provided, and a ventilation channel for introducing the outside air P into the container main body as shown by an arrow is formed.

When the first sealing valve 23B1 of the piston part 23 is slid and in pressure-contact with respect to the cylinder part 11, the ventilation channel is closed or opened.

Meanwhile, in the state before the liquid in the container main body is jetted, the vertical position of the ventilation hole S2 of the cylinder part 11 is between the first sealing valve 23B1 and the second sealing valve 23B2 of the piston part 23.

More specifically, the second sealing valve 23B2 is formed for preventing the liquid that is sucked up by the introducing tube 11B and then entered the interior of the cylinder part 11 from leaking, and the first sealing valve 23B1 is formed for preventing the outside air P from being communicated via the ventilation hole S2.

When the trigger 3 is pulled in this state, the liquid in the cylinder part 11 is jetted from the nozzle part 21.

In this case, the piston part 23 is pushed down by the trigger 3, and the first sealing valve 23B1 in the upper side is moved to the side below the ventilation hole S2 while sliding the inner wall of the cylinder part 11.

The outside air P enters inside the cylinder part 11 and enters the container main body via the ventilation hole S2, and a negative pressure is released.

When the pressing toward the finger-rest part 31 of the trigger 3 is released in this state in order to return to the original state, the piston part 23 is lifted up by the returning force of the spring part 33, and the liquid in the container main body is lifted up via the introducing tube 11B and fills the inside space in the cylinder part 11 (as a matter of course, also the interior of the piston part).

Finally, the first sealing valve 23B1 is moved to the upper side of the ventilation hole S2, the flow of the outside air P is blocked, and it returns to the original state.

Herein, working of the piston structure 2 will be described in detail in order to show the function of the coupling part 22 which is an important part of the present invention.

At this moment, the finger-rest part 31 of the trigger 3 is pulled in order to jet the liquid to a predetermined location. The trigger 3 turns based on the first pivotally attached part P1.

The trigger 3 is pivotally attached to the piston part 23 (second pivotally attached part P2) by the two-diverged part 32; therefore, the piston part 23 is downwardly pushed down by the turning of the trigger 3.

The liquid in the cylinder part 11 is compressed by the downward movement of the piston part 23, reaches the nozzle part 21 through the coupling part 22, and is jetted to outside from a jet opening N1.

In this process, due to the push-down of the piston part 23, the nozzle part 21, which is integrated with it, is also to be pulled down; however, as descried above the nozzle part is not lowered since the nozzle part 21 is fixed between the base body 1 and the cover body 4.

However, herein, the coupling part 22 is bent and deformed and actively absorbs the vertical movement of the piston.

In this manner, even though the nozzle part 21 is fixed, the trigger-type pump dispenser of the present invention can vertically move the piston part 23 by the working of the coupling part 22.

Upon jetting of the liquid, the liquid can be precisely jetted to a position serving as a target in the state in which there is completely no vertical movement of the jet opening N1.

Since the many fins 22A are formed in the periphery of the coupling part 22, the channel cross section thereof is not deformed at all even when it is bent.

Therefore, the liquid can be efficiently jetted without a trouble.

A device part for preventing the nozzle part 21 from being affected by the movement of the piston part 23 is not additionally required like conventional cases; therefore, the structure as the trigger-type pump dispenser is simplified.

Therefore, the failure rate is lowered, and required assembling man-hours are reduced.

The present invention has been explained above; however, the present invention is not limited to merely the above described embodiment, and it goes without saying that various modifications can be made without departing from the essence thereof.

For example, attachment of the distal end of the spring part 33 of the trigger 3 to the base main body 1 can employ an arbitrary means such as fitting, inserting, or supporting.

From the viewpoint of bending and deformation property, the piston structure 2 uses the silicone resin, the LLPDE resin; however, another elastomer resin excellent in the elastic-compression bending property can be used merely at the coupling part.

INDUSTRIAL APPLICABILITY

The present invention relates to a trigger-type pump dispenser which jets liquid in a cylinder from a nozzle part to outside by vertically sliding a piston member, wherein the trigger-type pump dispenser is capable of precisely hitting a position serving as a target by liquid in the state in which there is no vertical movement of a nozzle part at all and has a simple structure; however, the present invention can be applied to other fluid jetting field as long as the principles thereof are utilized, and the application field thereof is wide.

BRIEF DESCRIPTION OF THE DRAWINGS

FIGS. 1A and 1B are explanatory drawings showing the state before turning a trigger of a trigger-type pump dispenser according to an embodiment of the present invention, wherein FIG. 1A is a planarly-viewed partial cross sectional view, and FIG. 1B is a laterally-viewed cross sectional view;

DESCRIPTION OF REFERENCE NUMERALS

Figure 1A:
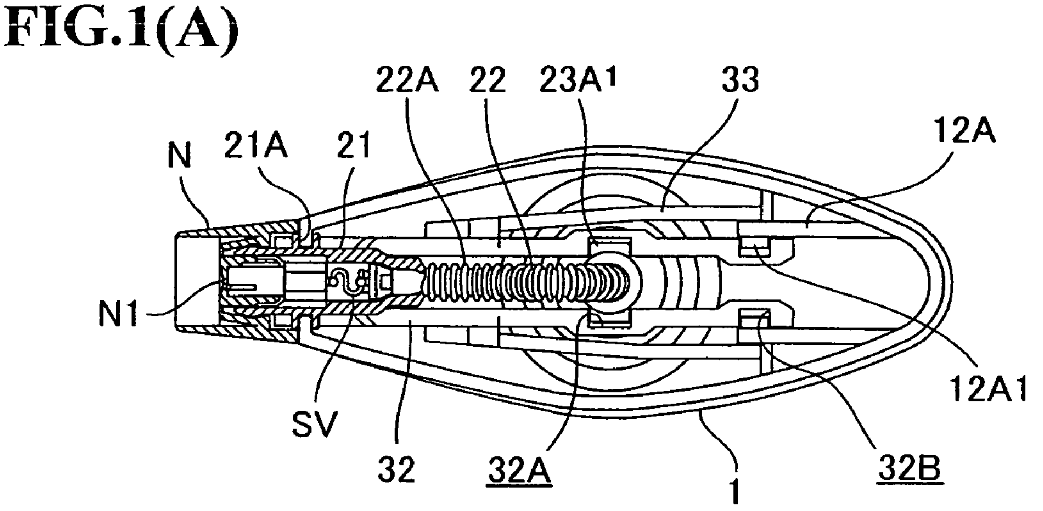
Figure 1B:
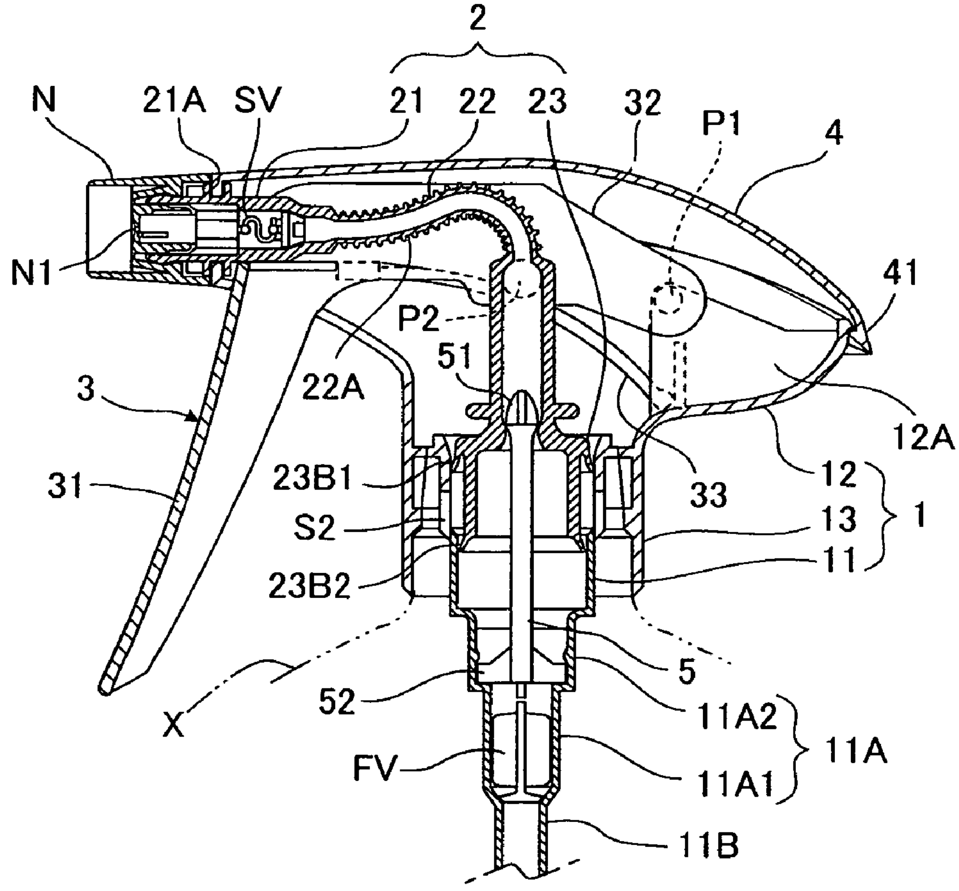
Figure 2:
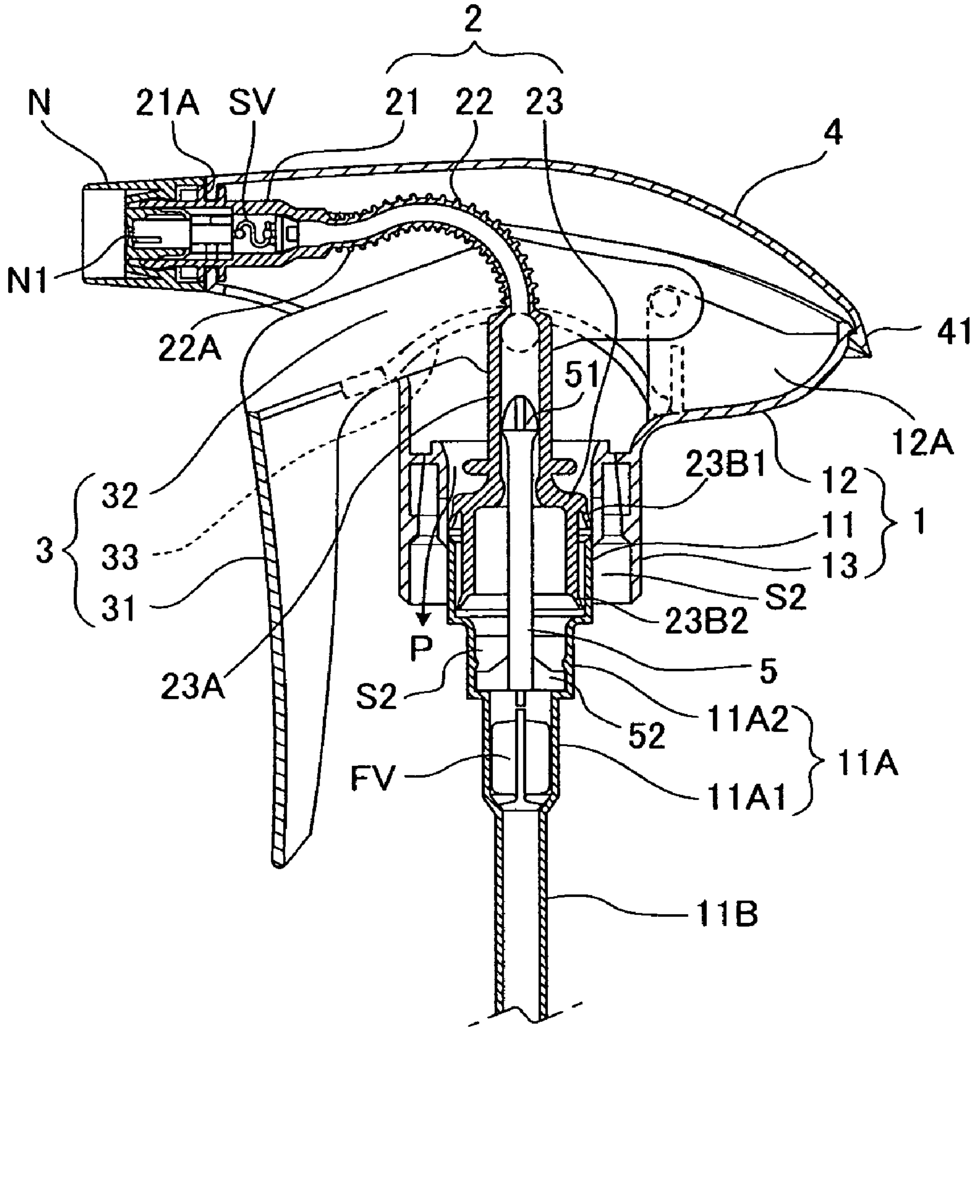
FIG. 2 is an explanatory drawing showing the state after turning the trigger of the trigger-type pump dispenser according to the embodiment of the present invention.
Figure 3:
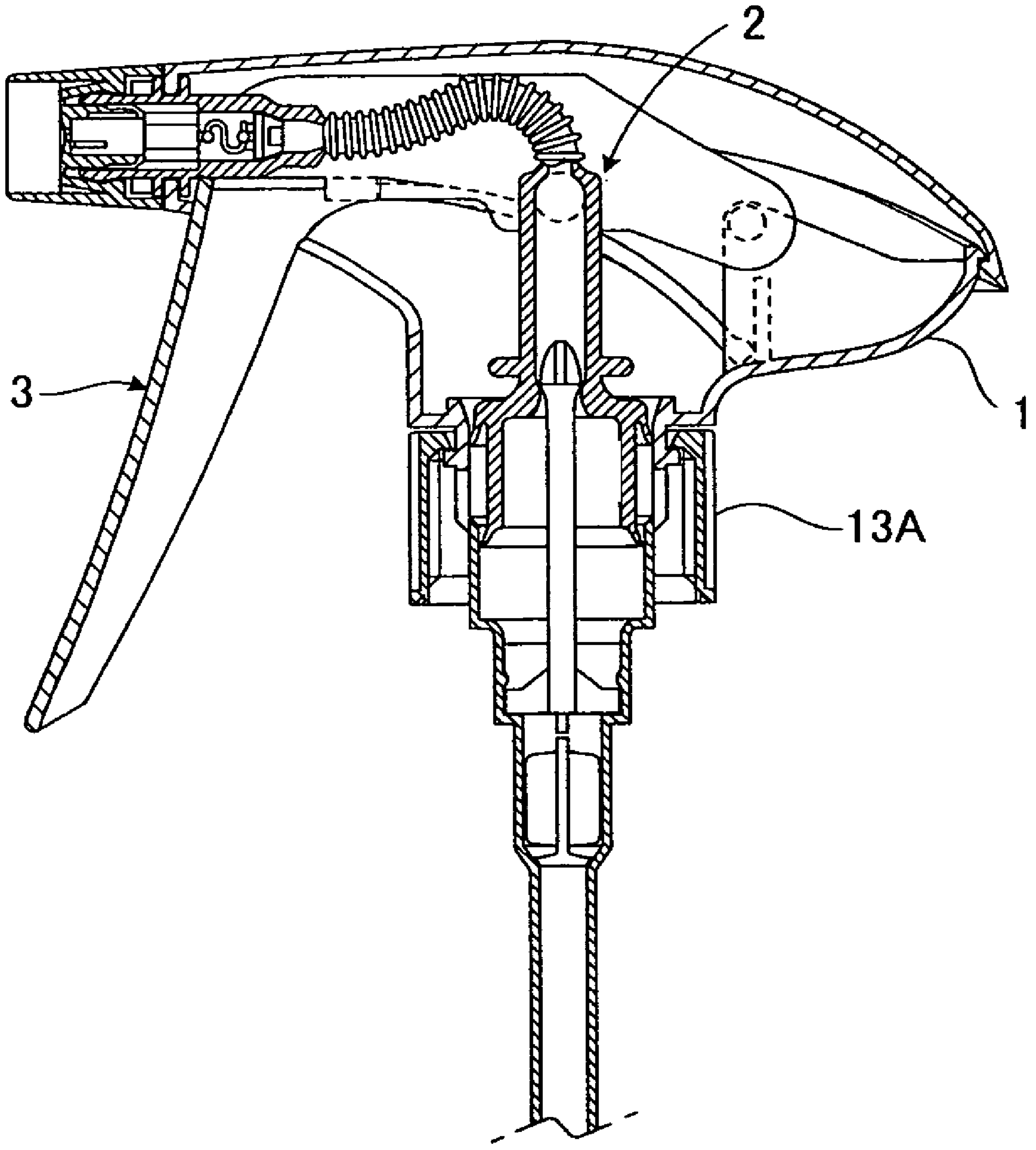
FIG. 3 is an explanatory drawing showing a trigger-type pump dispenser according to an embodiment of the present invention, wherein a cap is a separated member.
Figure 4:
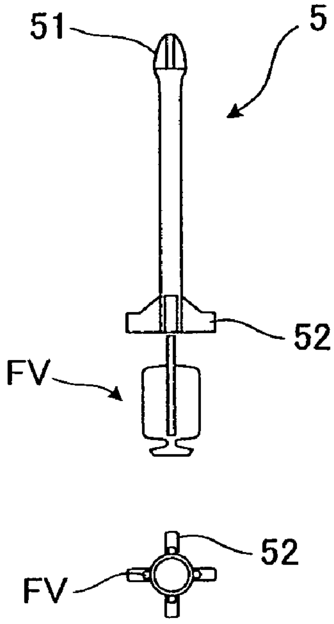
FIG. 4 is a drawing showing the state in which a closing valve is integrally formed with a first valve and is a drawing showing a piston structure in the trigger-type pump dispenser of the present invention.
Figure 5:
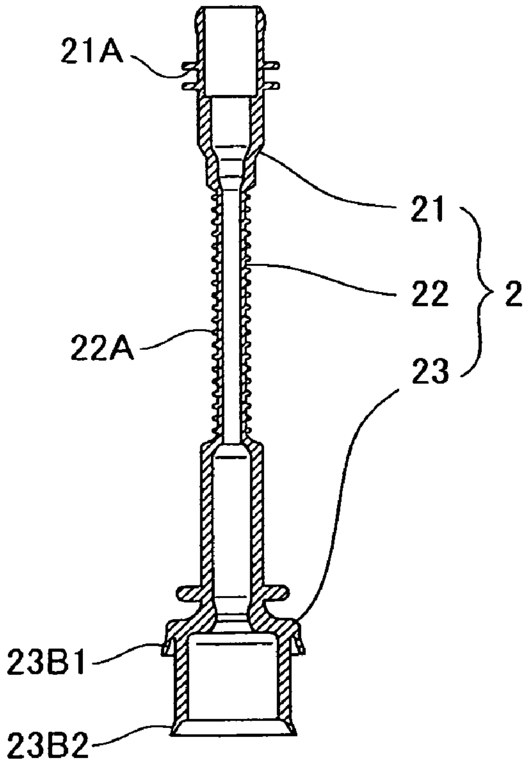
FIG. 5 is a drawing showing the piston structure.
Figure 6:
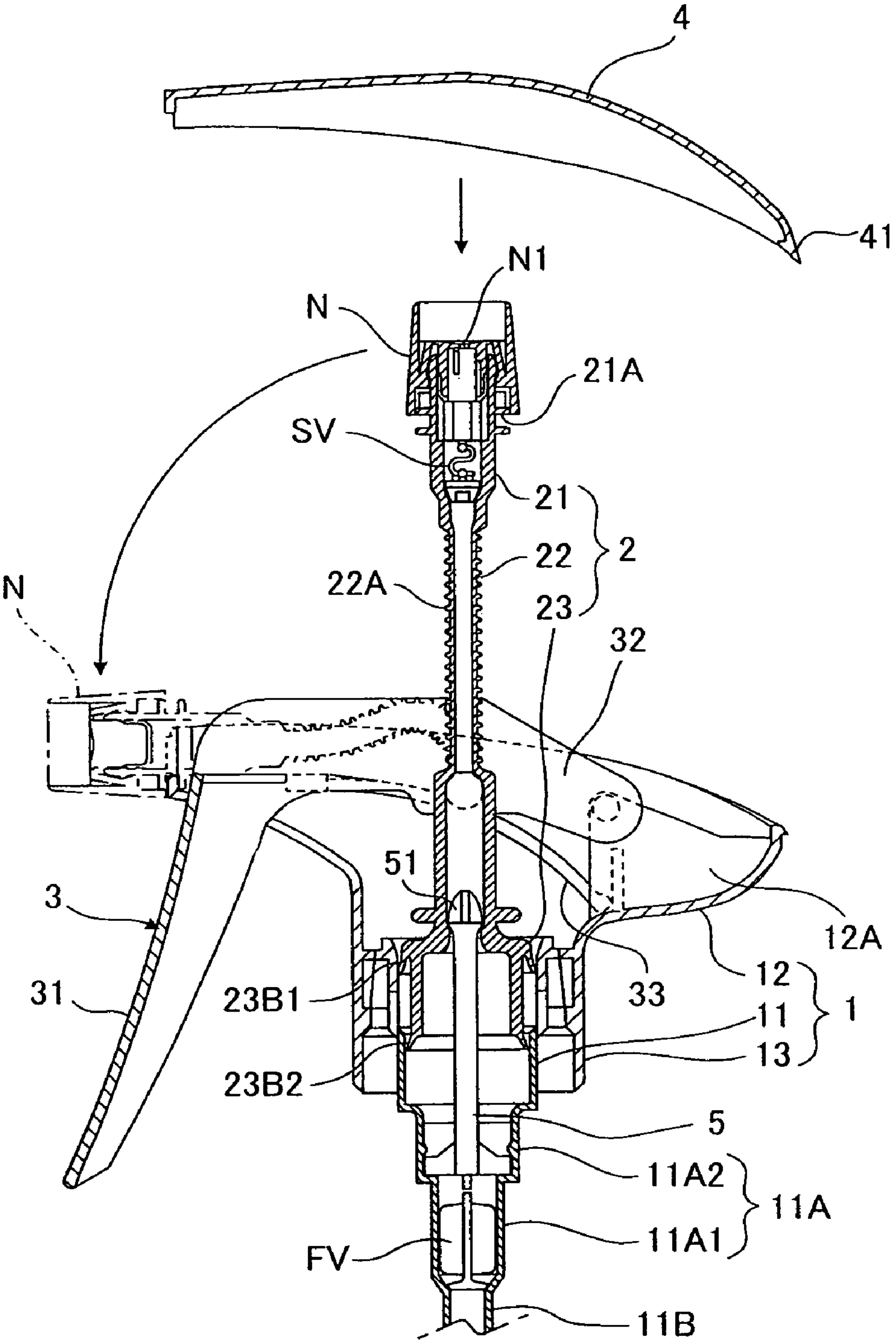
FIG. 6 is a drawing explaining an assembling operation example of the piston structure.

1 . . . BASE MAIN BODY
11 . . . CYLINDER PART
11A . . . TUBULAR PART
11A1 . . . SMALL-DIAMETER PART
11A2 . . . LARGE-DIAMETER PART
11B . . . INTRODUCING TUBE
12 . . . EXPANDED PART
12A . . . UPRIGHT WALL PART
12A1 . . . CIRCULAR PROJECTION
13 . . . CAP
13A . . . CAP
2 . . . PISTON STRUCTURE
21 . . . NOZZLE PART
21A . . . CIRCUMFERENTIAL GROOVE
22 . . . COUPLING PART
22A . . . FIN
23 . . . PISTON PART
23A . . . SMALL-DIAMETER PART
23A1 . . . CIRCULAR PROJECTION
23B1 . . . FIRST SEALING VALVE
23B2 . . . SECOND SEALING VALVE
3 . . . TRIGGER
31 . . . FINGER-REST PART
32 . . . TWO-DIVERGED PART
32A . . . CIRCULAR HOLE
32B . . . CIRCULAR HOLE
33 . . . SPRING PART
4 . . . COVER BODY
41 . . . EAVE PART
5 . . . CLOSING VALVE
51 . . . BULGED PART
52 . . . BASE PART
FV . . . FIRST VALVE
SV . . . SECOND VALVE
N . . . NOZZLE
N1 . . . JET OPENING
S2 . . . VENTILATION HOLE
P . . . OUTSIDE AIR
P1 . . . FIRST PIVOTALLY ATTACHED PART
P2 . . . SECOND PIVOTALLY ATTACHED PART

The invention claimed is:

1. A trigger-type pump dispenser for jetting liquid, which is in a cylinder part, from a nozzle part to outside by vertically sliding a piston part in a cylinder by turning a trigger, the trigger-type pump dispenser comprising:

a base main body having the cylinder part inside and attachable to an opening part of a container main body;

a cover body detachably latched with the base main body;

a piston structure comprising the nozzle part engaged with the base main body, the piston part, and a bendable coupling part coupling the nozzle part and the piston part; and the trigger turnably attached to the base main body for vertically sliding the piston part in the cylinder; wherein many fins are formed on the periphery of the coupling part so that an interior channel cross section is not deformed.

2. The trigger-type pump dispenser according to claim 1, wherein the coupling part of the piston structure can be bent by an angle of 90 degrees or more.

3. The trigger-type pump dispenser according to claim 1, wherein a rod-like closing valve for blocking the pressure in the container by sealing a channel, which is in the piston part, at a top dead point of the piston part is provided in the cylinder part.

4. The trigger-type pump dispenser according to claim 3, wherein the rod-like closing valve is integrally formed with a first valve upon manufacturing and, upon use, separated from each other and subjected to use.

5. The trigger-type pump dispenser according to claim 1, wherein an eave part for covering the latched part of the base main body and the cover body is provided on the cover body.

6. The trigger-type pump dispenser according to claim 1, wherein a cap part and an introducing tube are integrated with the base main body.

7. The trigger-type pump dispenser according to claim 1, wherein an end of the trigger is pivotally attached to the base main body by a first pivotally attached part, an intermediate position of the trigger is pivotally attached to the piston part by a second pivotally attached part.

8. The trigger-type pump dispenser according to claim 7, wherein the ratio of the distance between the first pivotally attached part and the second pivotally attached part and the distance from the position of the first pivotally attached part to a distal end of the trigger is 1:4.5 or more.

* * * * *